US008744902B2

(12) United States Patent
Nguyen et al.

(10) Patent No.: US 8,744,902 B2
(45) Date of Patent: Jun. 3, 2014

(54) REVENUE MANAGEMENT SYSTEM AND ASSOCIATED METHOD FOR UPDATING AND LIMITING FUTURE SALES OF SPACES OF A TRAVEL-RELATED SERVICE

(75) Inventors: Anh Quan Nguyen, Villeneuve-Loubet (FR); Denis Arnaud, Grasse (FR); Charles-Antoine Robelin, Antibes (FR); Benoit Lardeux, Roquefort-les-Pins (FR)

(73) Assignee: Amadeus S.A.S., Sophia Antipolis (FR)

( * ) Notice: Subject to any disclaimer, the term of this patent is extended or adjusted under 35 U.S.C. 154(b) by 0 days.

(21) Appl. No.: 13/171,010

(22) Filed: Jun. 28, 2011

(65) Prior Publication Data

US 2012/0310706 A1    Dec. 6, 2012

(30) Foreign Application Priority Data

Jun. 1, 2011   (EP) .................................... 11305675

(51) Int. Cl.
*G06Q 30/00*   (2012.01)
*G06Q 10/02*   (2012.01)
*G06Q 30/06*   (2012.01)

(52) U.S. Cl.
CPC ................ *G06Q 10/02* (2013.01); *G06Q 30/06* (2013.01)
USPC .......................... 705/7.35; 705/7.31; 705/7.29

(58) Field of Classification Search
USPC ....................................... 705/7.35, 7.29, 2.31
See application file for complete search history.

(56) References Cited

U.S. PATENT DOCUMENTS

| 5,299,115 | A | * | 3/1994 | Fields et al. .................. 705/7.22 |
| 5,963,919 | A | * | 10/1999 | Brinkley et al. ................ 705/28 |
| 6,963,854 | B1 | * | 11/2005 | Boyd et al. ...................... 705/37 |
| 7,263,496 | B1 | * | 8/2007 | Weigelt et al. ............... 705/7.25 |
| 7,328,166 | B1 | * | 2/2008 | Geoghegan et al. .............. 705/5 |
| 7,899,699 | B1 | * | 3/2011 | Kumar ......................... 705/7.31 |
| 2002/0156659 | A1 | | 10/2002 | Walker et al. |
| 2004/0249696 | A1 | * | 12/2004 | Mathews et al. ................. 705/10 |
| 2005/0071206 | A1 | | 3/2005 | Berge |
| 2005/0169452 | A1 | * | 8/2005 | Prigogin et al. ......... 379/265.01 |
| 2006/0015396 | A1 | | 1/2006 | Blomeyer |
| 2006/0200370 | A1 | * | 9/2006 | Ratliff et al. ...................... 705/5 |
| 2007/0265754 | A1 | | 11/2007 | Curtis et al. |
| 2009/0030741 | A1 | * | 1/2009 | Veitch ................................. 705/5 |
| 2010/0010870 | A1 | * | 1/2010 | Millar et al. .................... 705/10 |
| 2012/0209662 | A1 | * | 8/2012 | Kahn et al. .................. 705/7.31 |

FOREIGN PATENT DOCUMENTS

EP            2 224 399  A1    9/2010

OTHER PUBLICATIONS

Extended European Search Report for European Application No. 11305675.8 (Oct. 14, 2011).
Commonly-assigned, co-pending U.S. Appl. No. 13/170,974 for "A Method and System for Optimizing Revenue Management in a Travel Environment," (Unpublished, Filed Jun. 28, 2011).

(Continued)

*Primary Examiner* — Susanna M Meinecke Diaz
*Assistant Examiner* — Deirdre Hatcher
(74) *Attorney, Agent, or Firm* — Wood, Herron & Evans, LLP

(57) ABSTRACT

A revenue management system comprising a first revenue management route which includes a forecast module and an optimization module and which calculates expected revenue for sales of inventor items based on historical data; a second revenue management route which is selected if the confidence in the forecasting in the first route is below a predetermined value.

15 Claims, 4 Drawing Sheets

EFCT: extended forecasting
ROPT: robust optimization

(56) References Cited

OTHER PUBLICATIONS

Birbil et al., "The Role of Robust Optimization in Single-Leg Airline Revenue Management", Management Science, INFORMS, vol. 55, No. 1, pp. 149-163 (2009).

Graff, "Revenue management for the whole aircraft: Coordinating acceptance decisions for passenger and cargo transportation," Journal of Revenue and Pricing Management, vol. 7, No. 4, pp. 397-401 (Jul. 1, 2008).

Lan et al., "Revenue Management with Limited Demand Information," Management Science, INFORMS, No. 54, vol. 3, pp. 1594-1609 (2008).

Perakis et al., "Robust Controls for Network Revenue Management," Manufacturing and Service Operations Management, vol. 12, No. 1, pp. 56-76 (2010).

"A look at Cargo Revenue Management," White Paper, Sabre Inc., pp. 1-9 (2004).

Talluri et al., "The Theory and Practice of Revenue Management," Springer, New-York, NY, USA, pp. 102-111 (2004).

Zeni, "Improved Forecast Accuracy in Airline Revenue Management by Unconstraining Demand Estimates from Censored Data," PhD Thesis, Rutgers University, Newark, NJ, pp. 78-85 (2001).

Talluri et al., "A Randomized Linear Programming Method for Computing Network Bid Prices," vol. 33, No. 2, pp. 207-216 (May 1999).

Ben-Tal et al., "Robust Solutions of Uncertain Linear Programs," Operations Research Letters, Elsevier, vol. 25, No. 1, pp. 1-13 (1999).

Vinod "Origin and Destination Yield Management," The Handbook of Airline Economics, D. Jenkins, New-York, NY, USA, pp. 459-468 (1995).

Brumelle et al., "Airline Seat Allocation with Multiple Nested Fare Classes," Operations Research, INFORMS, vol. 41, No. 1, pp. 127-137 (1993).

Williamson, "Airline Network Seat Control," PhD Thesis, MIT, Cambridge, MA, USA, pp. 67-93 (1992).

Wollmer, "An Airline Seat Management Model for a Single Leg Route when Lower Fare Classes Book First," Operations Research, INFORMS, vol. 40, No. 1, pp. 26-37 (1992).

Curry, "Optimal Airline Seat Allocation with Fare Classes Nested by Origins and Destinations," Transportation Science, INFORMS, vol. 24, No. 1, pp. 193-204 (1990).

Dror et al., "Network Models for Seat Allocation on Flights," Transportation Research B, Elsevier, vol. 22, No. 4, pp. 239-250 (1988).

Belobaba, "Air Travel Demand and Airline Seat Inventory Management", PhD Thesis, MIT, pp. 112-131 (1987).

Kouvelis et al., "Robust Discrete Optimization and its Applications," Kluwer Academic Publishers, London, GB, pp. 1-27 (1997).

USPTO, Office Action issued in related U.S. Appl. No. 13/170,974 dated Jan. 4, 2013.

USPTO, final office action issued in U.S. Appl. No. 13/170,974 dated Sep. 11, 2013.

\* cited by examiner

EFCT: extended forecasting
ROPT: robust optimization

US 8,744,902 B2

REVENUE MANAGEMENT SYSTEM AND ASSOCIATED METHOD FOR UPDATING AND LIMITING FUTURE SALES OF SPACES OF A TRAVEL-RELATED SERVICE

PRIORITY CLAIM

This application claims the benefit of European Patent Application No. 00305675.8 filed Jun. 1, 2011, the disclosure of which is incorporated herein by reference.

FIELD OF THE INVENTION

The present invention relates to improvements in relating to a revenue management system and associated method.

BACKGROUND OF THE INVENTION

An inventory manages resources that may be used to respond to a customer request. A customer request may be satisfied using one resource or combining several resources. These resources may be provided to customers through several products sold at different prices. A revenue management system is able to update and manage parameters that limit the number of each product that can be sold.

It is known that passengers with low willingness-to-pay purchase air travel tickets earlier than the passengers willing to pay more, for products having the same resources. As a result the revenue management system must decide between selling a product immediately, and waiting for a booking request that brings more revenue later. In the former case, early selling of the resources means that they will unavailable in the future, when prices may be higher. Revenue management systems are typically used in the airline industry, the hospitality industry, car rental industry, etc. to maximize revenue coming from sales of products using the available resources, such as airplane seats, hotel rooms, rental cars, etc, The output from a revenue management system are controls, such as booking limits (the number of units of a given product that may be sold), protection levels (the number of resources that should be reserved for a given product only) or bid prices (also known as a threshold price at which a product may be sold if and only if its price is above the bid price). The present invention may be applied regardless of the output of the revenue management system to which it pertains.

In revenue management systems, the outputs (e.g., booking limits) are computed with the object of maximizing the revenue "to-go" (i.e., the revenue to be made from the sale of the resources that are still available), or the expected revenue to go if the stochastic nature of the demand (number of customers that request a product) is taken into account. An important input to the optimization is an estimate (also called forecast) of demand for every product. It is notoriously difficult to calculate accurate forecasts. Currently, forecasts they are often based on data recorded from previous sales for flights which have already departed. More pertinent data relating to the prediction of patterns of demand would mean that more accurate forecasting could be possible.

FIG. 1 shows a known revenue management system 100. The revenue management system manages an inventory of resources 102 based on historical data 104. The revenue management system further includes three modules: an unconstraining (UNC) module 106, a forecasting (FCT) module 108 and an optimization (OPT) module 110.

In some situations or markets, the historical data is unreliable as it may include factors which have changed, for example new routes, schedule changes, the accommodation of previously booked and reserved resources, changes in behaviour on different days or any other variation or change which may occur to the resource that may or may not have previously occurred. The reliance on historical data then results in a mismatch between the forecast and actual demand.

This in turn results in sub-optimal recommendations being calculated by the revenue management system. Thus some resources may be wasted (e.g., empty seats at the departure time of a flight) and as a result the demand wiii be diluted, meaning that some passengers willing to pay high fares have finally booked in lower booking classes (typically with lower fares). As a result, the actual revenue could be much lower than the revenue that could have been made if better information about demand had been available.

FIG. 2 is a graph of actual value of demand against actual revenue and shows a revenue distribution 200 and missed revenue 202.

Most revenue management models assume that demand can be expressed using a probability distribution. However, these probability distributions are difficult to estimate, especially for new or unstable markets. Investigations into the field of robust optimization to find new methods dedicated to revenue management with less well defined demands are ongoing. Robust optimization methods are intended to produce a satisfactory level of revenue in a wide range of possible actual values of demand: in other words, these methods offer robustness with respect to changes in input parameters, such as demand forecast. The problems associated with applying robust optimization to the field of revenue management are not resolved.

Recent papers (Lan Y., Gao H., Ball M. and Karaesmen I., "*Revenue Management with Limited Demand Information*", Management Science, INFORMS, 54(3):1594-1609, 2008; and Perakis G. and Roels G., "*Robust Controls for Network Revenue Management*", Manufacturing and Service Operations Management, INFORMS, Forthcoming) have disclosed nested booking limits for static model and dynamic policies. These papers introduce the criteria of robustness, which are then compared. The criteria of robustness may include absolute robustness or absolute deviation and on average appear to behave as well as baseline methods such as Expected Maximization Seat Revenue, which calculate the optimum revenue in a traditional sense. There is no mention of how the principles can be implemented in a revenue management system.

OBJECTS OF THE INVENTION

It is an object of the present invention to overcome at least some of the problems associated with the prior art.

It is a further object of the present invention to provide an improved revenue management system which is less affected by deficient input parameters and leads to less missed opportunity in terms of revenue.

SUMMARY OF THE INVENTION

The present invention provides a method and system as set out in the accompanying claims.

According to one aspect of the invention there is provided a revenue management system comprising a first revenue management route which includes a forecast module and an optimization module and which calculates expected revenue for sales of inventory items based on historical data; a second revenue management route which is selected if the confidence in the forecasting in the first route is below a predetermined value.

Optionally, including a switch for selecting the second revenue management route.

Optionally, the second route is automatically selected.

Optionally, wherein the second route is selected when there is no historical data.

Optionally, determining if the confidence in the forecast is below said predetermined value.

Optionally, the second revenue management route includes a demand distribution module for forecasting a range of demand for the items and a robust optimization module.

Optionally, the robust optimization module calculates a solution which ensures a maximum level of revenue in the maximum number of cases.

According to a second aspect of the present invention, there is provided a robust revenue management module for use in a revenue management system, wherein the robust revenue management module can be added to the revenue management system and used to calculate expected revenue when confidence in a forecast from the revenue management system falls below a predetermined value.

According to a third aspect of the present invention, there is provided a method of calculating inventory controls from an inventory of items to enable calculating expected revenue from sale of the inventory items, the method comprising: calculating the expected revenue by forecasting the expected sales and optimizing the revenue that can be generated by the expected revenue for the expected sales, wherein the calculation is based on historical data; measuring the confidence in the forecast values; and if the confidence is below a predetermined value, selecting a second robust revenue management technique to determine the expected revenue.

The present invention provides a number of advantages. The present invention provides a mechanism to identify critical resources which should be managed by the robust management system. The invention further offers a means to calculate forecast dedicated to computation of robust controls. Also the invention provides a new process to determine the controls (including, but not limited to, bid prices) which are use in the calculation to accept or deny a sale at any time during the reservation window, with respect to a robust criterion.

The above mentioned features of the invention are closely related in order to provide a new suite of revenue management systems. An improvement from existing systems would include a second mode of inventory control calculation which is activated when there is a difficult demand forecast characterization.

A further feature of the invention is to ensure revenue for airlines even if the forecast becomes highly uncertain. In a rapidly or constantly evolving market, such a revenue management system would be a substantial advantage for the airline which uses it.

BRIEF DESCRIPTION OF THE DRAWINGS

Reference will now be made, by way of example, to the accompanying drawings, in which.

DETAILED DESCRIPTION OF THE PREFERRED EMBODIMENTS

The present invention relates to a revenue management (RM) system and associated method for use in industries which have to sell limited resources, such as flight seats for a specific route or airline.

Figure 1:
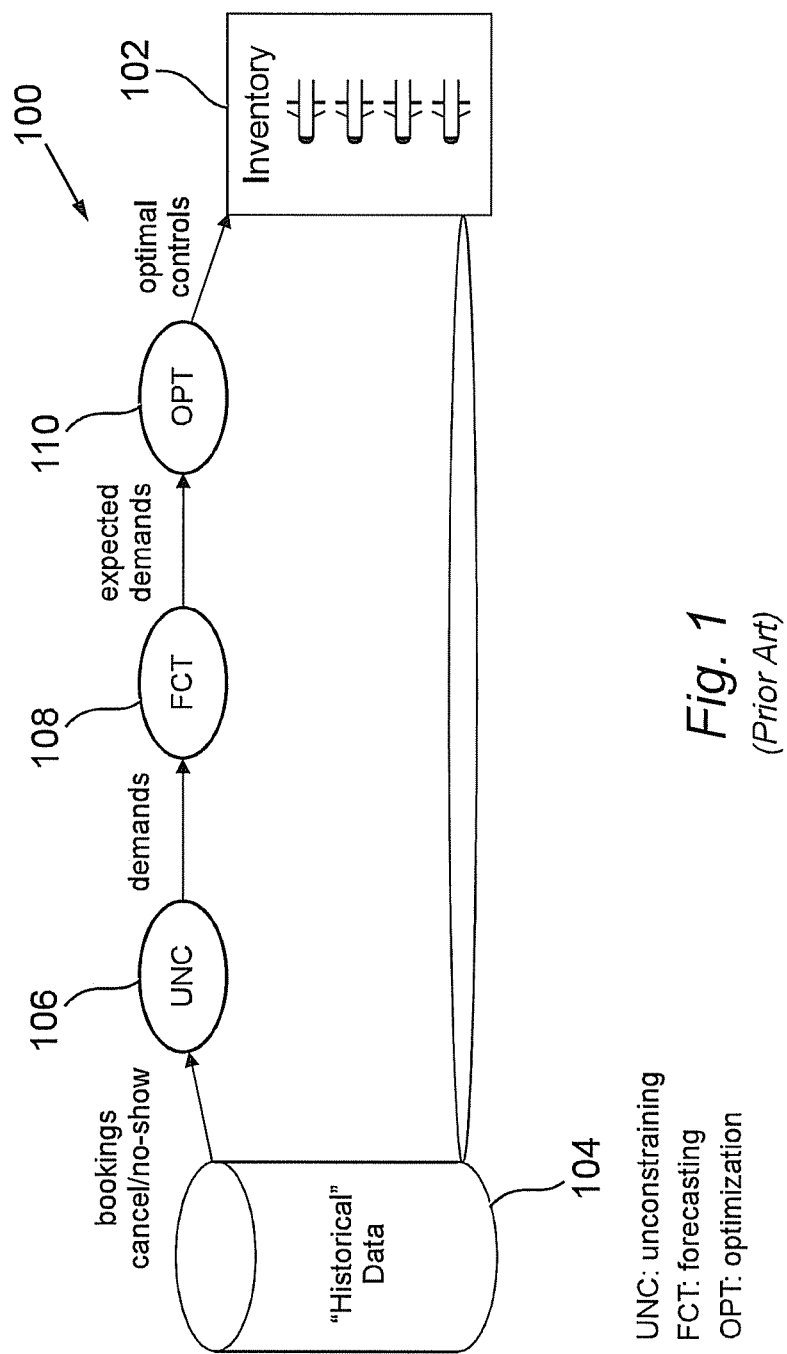
FIG. 1 is a revenue management system in accordance with the prior art.
Figure 2:
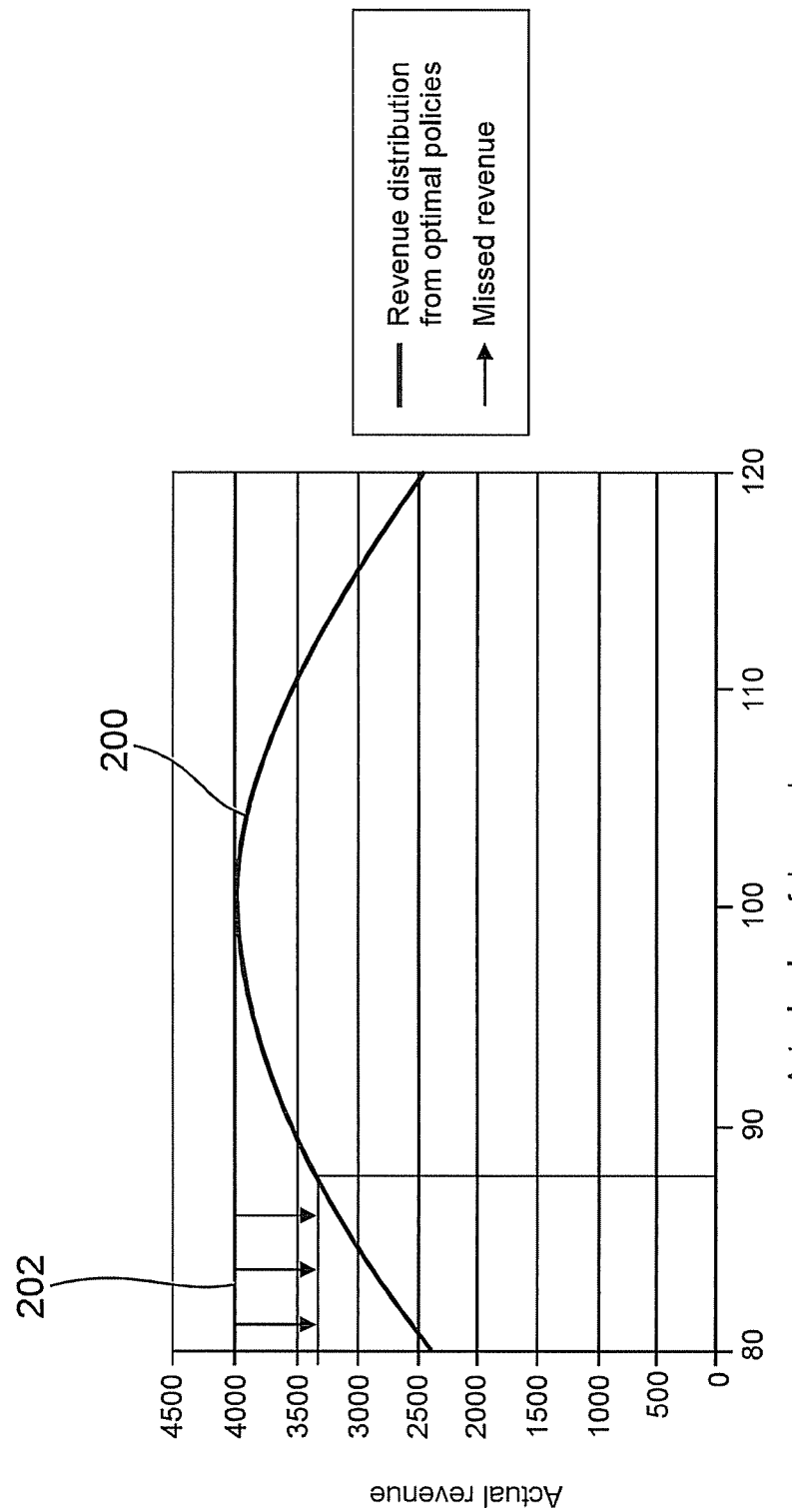
FIG. 2 is a graph of a revenue distribution from the FIG. 1 system.
Figure 3:
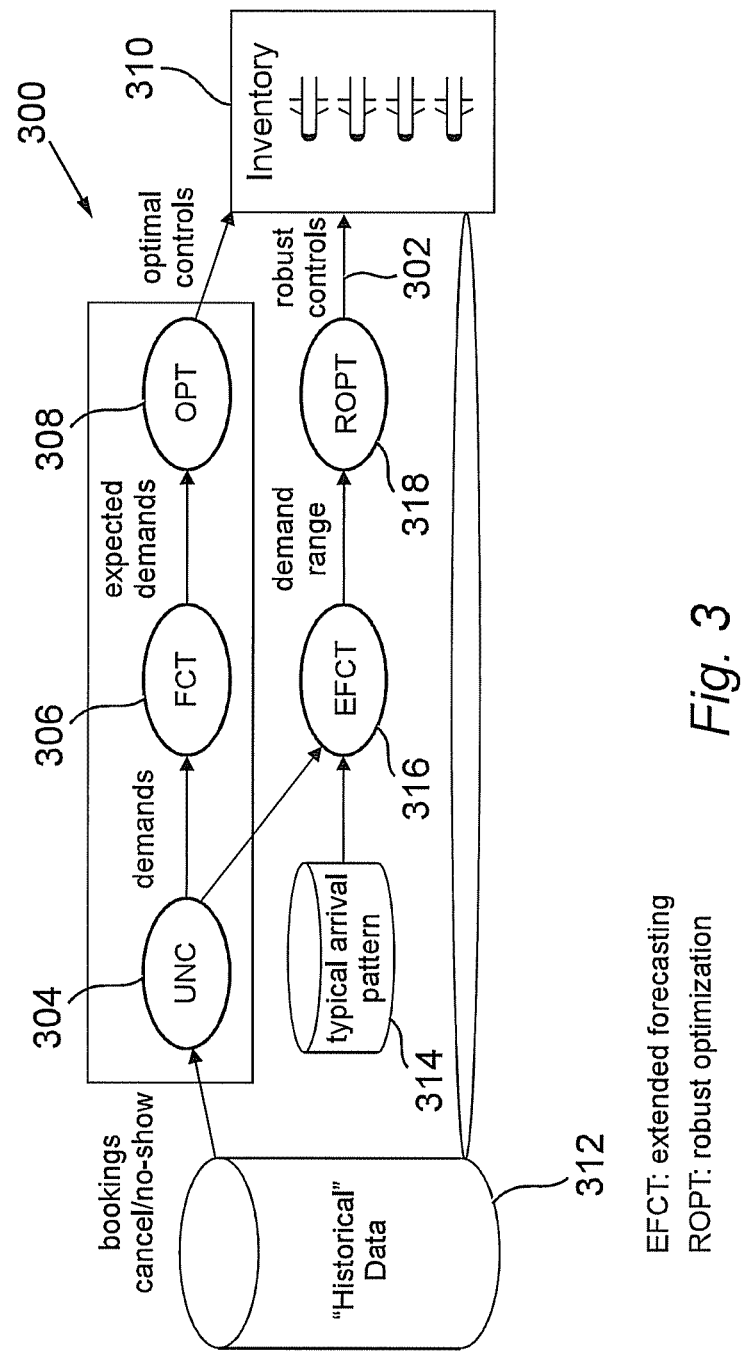
FIG. 3 is a revenue management system, in accordance with an embodiment of the invention.

The invention relates to a hybrid revenue management system which integrates robust models and automatically switches from a traditional RM approach to the robust one and vice versa. This is shown in FIG. 3. FIG. 3 is a block diagram of the RM system of the present invention and includes a traditional RM route 300 and a robust RM route 302. The traditional RM route is similar to that shown in FIG. 1 and includes an un-constraining module 304, a forecasting module 306 and an optimization module 308. Similarly, the RM system includes an inventory 310 and historical data 312. In addition, the robust RM route 302 includes a module 314 for defining a typical arrival pattern of requests for purchase of the inventory items; and an extended forecasting module 316 and a robust optimization module 318.

The inventory 310 includes recorded bookings, cancellations and "no-shows" (customers who bought a product but did not use it, without giving prior notice: for example, an air passenger who purchased a ticket and did not show up at the airport for the flight they booked). Controls such as bid prices are also stored in the inventory. These are useful to close classes (or yield ranges, which is another manner of defining products) and provide product availability.

An update of controls may be made by any one of the two optimizers in this configuration. One of two options may be selected:

When it is determined that demand is well estimated, controls that are optimal in a traditional sense are computed by the standard optimizer (OPT) apply leg-based heuristics such as EMSR or exact algorithms (Dynamic Programming or Monte Carlo approach); or, When it is determined that demand is difficult to estimate, the robust optimizer (ROPT) computes controls.

The determination of whether demand is difficult to estimate or not will be described below.

A circle surrounds several systems which are part of the forecaster. First, the un-constraining module (UNC) which deals with "historical" Data (meaning bookings already made in similar resources previously sold), such as flights or rooms, builds uncensored demands. Two possibilities are available at this stage. If the set of unconstrained demands is based on numerous and consistent data, the traditional forecaster (FCT) is able to determine the demand distribution that is fed the standard optimizer. If not, the approached forecaster (AFCT) calculates a range of expected demand for every product from the unconstrained demand with high variability and/or from typical arrival patterns.

The inventory communicates with the historical data bases to provide the recorded bookings and cancellations in order to make such data available to the forecaster.

Figure 4:
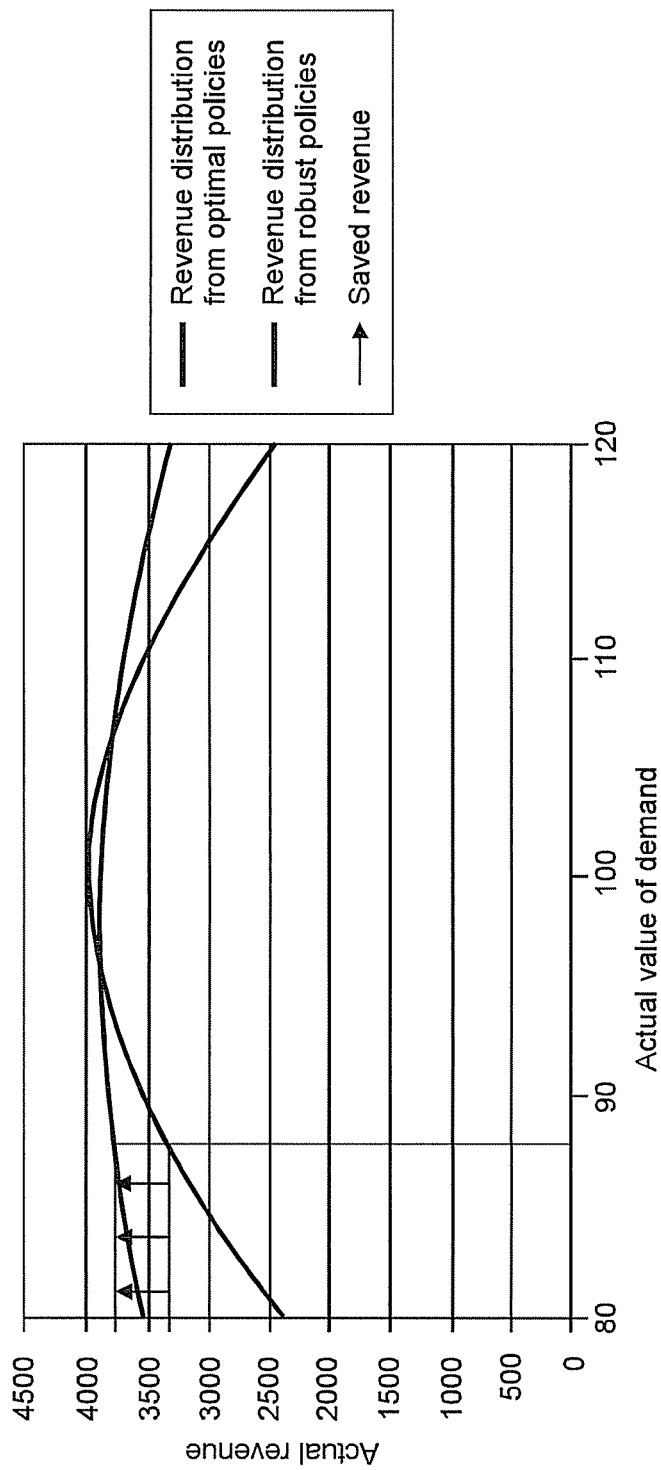
FIG. 4 is a graph of a revenue distribution from the FIG. 3 system, in accordance with an embodiment of the invention.

FIG. 4 plots the model of the revenue variations of two policies with respect to the values of actual demand, when demand is difficult to forecast. The first traditional policy is optimal. Hence, when the actual demand equals or has the same distribution as the forecasted demand, revenue is optimal (i.e., there was no foreseeable way of obtaining a higher revenue). However, when actual demand differs from forecasted demand, applying the first traditional policy leads to a potential missed opportunity in terms of revenue (i.e., it may possible to obtain higher revenue, with a different policy).

Averaging this "loss of revenue from missed opportunity" across all possible instances of demand provides an estimate of the expected missed opportunity. The expected missed opportunity is smaller if the robust policy is applied than if the traditional policy is applied. When looking at individual instances of actual demand, the robust policy may lead to lower revenue than the traditional policy (e.g., when actual demand is very close to the forecast demand) or may lead to higher revenue. On average, the robust policy provides higher revenue than the traditional policy. In the present case, the expected demand is up to 99. If only 87 requests arrive, the robust controls would save 900 Euros (4700-3800) according to optimal controls.

In a broad sense the invention includes three features. The first is a model to select the manner of computing inventory controls, either applying the traditional or robust optimization. The choice is controlled by assessing the quality of forecast and switching between the two modes depending on this forecast quality measure.

In a second feature the input demands used in the revenue management models are characterized in a different manner depending on whether they relate to the traditional or the robust route. Different mechanisms are developed to determine roughly defined demands that are applied in the RM system when the historical data is deemed to be insufficiently reliable. Similarly, if no historical data exists for a particular resource or product, forecasts are defined with a large variance and the robust RM route is triggered.

In the traditional RM route inputs required to compute the inventory controls are generally provided by the demand distribution of all products. The forecaster provides distribution of probability with a mean and a variance for each product. In the robust context, only a range between a minimum and a maximum value should be necessary to run an algorithm for robust optimization. The demand is assumed to be uniformly distributed between these bounds.

Given a forecast defined with a normal distribution associated with a product, a confidence interval of possible values that feed the robust optimizer can be calculated with respect to a percentage defined by a user. For example, if the user wants to cover 70% of the demand around the mean. The system calculates two values a minimum and a maximum. All values in between the minimum and maximum are represented by construction based on 70% the demand. A forecast is then provided to the robust optimizer 318 by EFCT which is the module which calculates the relevant interval of forecast values.

This manner of defining the confidence range for robust models of RM is only available when the demand distribution can be calculated (even if the reliability of the calculation is very weak). Sometimes no data is available. In this case general arrival patterns are applied to define the demand distribution. Only minimum and maximum expected demands for any product given available capacity will be built based on extreme demand behaviours in similar markets.

The third feature of the invention relates to a new heuristic to compute a robust bid-price curve. This plots the "floor price" which may be accepted for sale of a product, making reference to the remaining available resources yet to be sold and which may be impacted by the sale in question.

Many factors can disrupt the market and change the impact of reservations on the inventory. Sudden market evolution, due to the entrance of a new competitor or a radical change in policy from the main competitor, could directly affect the booking arrivals such that the forecast becomes almost insignificant. When a new market is created the forecast is only approximate due to the lack of historical data or experience. In these cases the robust route is selected to ensure a certain level of revenue is predicted during the time spent collecting sufficient historical data for the traditional RM route 300.

Switching from the traditional to the robust RM route or system depends on the level of confidence in the forecast. This can be assessed by calculating the average of dispersion indices (ADI) among all product forecasts using a particular resource, such as a flight cabin for the airline industry. Other criteria may alternatively be selected. The index of dispersion is the ratio variance over the mean of the forecast distribution (often approximated as a normal distribution). A threshold value for the average value of the dispersion index is defined by the RM users for every product. If the calculated average value of the dispersion indices is lower than this threshold value, the traditional RM system is triggered for the resource and, if not, the robust RM system is launched. Where the market is well understood by the resource provider (airline, hotel etc.), the historical data provides the best forecast. The traditional revenue management model, which yields solutions maximizing the expected revenue, is more useful to increase revenue in this case. The design of the hybrid revenue management system described herein provides that robust controls are computed when confidence levels are low. Otherwise optimal (traditional) controls are applied when the market is stable and available accurate historical data is available.

If there is historical data available for a product, a set of unconstrained demands is generated from standard pre-defined arrival patterns associated with a high value of variance. These distributions can be built from data coming from similar markets. The forecast of the product will have a big impact on the calculation of ADI for the resources used by this product, due to the high value of attached variance.

An important element of any revenue management route is the optimization module; this will now be described in greater detail. The purpose of robust optimization in revenue management is computing policies that provide a high amount of revenue for many different configurations of forecast. In a traditional RM optimizer, the method targets a solution which maximizes the expected revenue for a resource or a set of resources such as a set of flight cabins. In robust optimization the target is different. The mathematical program looks for a good solution or revenue estimate available in many scenarios dependant on certain criteria. Depending on the context in revenue management and the application of such robust models, one such criterion is the robust deviation. This means that an optimum policy minimizes the potential missed revenue on average, when actual demand varies around the expected value.

Robust nested booking limits for any resource can be explicitly computed in the case of robust deviation from known mathematical models. The proof can be determined through linear programming such that the controls are applied directly in the inventory to calculate levels of availability.

In most revenue management systems relating to flights, bid-price curves are calculated between relevant origin and destination cities at any date. Given different values of remaining capacities of the resources used to link the origin to the destination, a threshold price is given to accept or reject the sell. If the request comes with a higher fare than the threshold price (also named bid-price) the required resources are made available to the customer, otherwise they are not.

The heuristic process used to compute the robust bid-price curve will now be described in further detail. This approach may replace the traditional methods of plotting a bid-price curve as soon as policy from at least one resource used to reach the destination from the origin is solved by the robust optimization process.

The heuristic process proceeds as follows. At a given time during the booking period, the robust nested booking limits are calculated for each discrete value of remaining capacity for resources from zero to the actual value of remaining capacity. The robust nested booking limits are also referred to as protection levels.

This generates a huge number of different scenarios of demand generation with respect to constraints caused by the range of possible demand values. The order of product generation does not matter, only the range of forecasted demands is considered.

The different demand scenarios are played through and the revenue associated with each scenario is calculated given the robust nested bookings limits. For each decrease in capacity of one a difference in revenue can be calculated for each scenario. The average value of the difference is calculated and considered to be the bid-price for this step of capacity decrease. This result represents the general case, although there are exceptions.

If the calculated bid-price at the remaining capacity x is higher than the bid-price at the remaining capacity x+1, the bid-price of x takes the value of the bid-price of x+1. If the remaining capacity is equal to the robust nested booking limit of a product, the bid-price is equal to the fare associated to this product.

The mechanism applied to choose resources managed by optimal policies and those by robust controls has to be well balanced. The system itself can select the most appropriate mode of optimization (robust or traditional) given the quality of forecasts. However a bad configuration may occur if vague forecast distributions for a resource occur during the booking period. This could lead many to switch from the robust to the traditional optimization route. In turn, this would give rise to unstable data for characterizing the demand for future resources to be sold. To solve this, a simple rule could be applied: if the system switches to the robust optimization for the second time during the booking period, the resource would remain optimized with robust algorithms until the end of the period for sales. It should be noted, the forecast is effectively not stable in this case. Hence, robust optimization is more appropriate than tradition in this situation. Alternatively, the system could be designed to give an allowance to a user to select the mode applied for each resource. Users could monitor the revenue management system and force the system into a preferred mode. This choice may also depend on the company policy.

The traditional forecast models become obsolete in the case of robust optimization. The optimizer does not need an accurate forecast that could be far from actual demand, it is better to rely on the robust controls. So called "vague forecasts" may be built which are dedicated to robust optimization. The heuristic functionality allows the inventory manager to select either the theft (bid-price) or no-theft (nested booking limits) robust policies. Addition of this heuristic provides a complete RM solution which should optimize the business concerns of any data.

The two new modules could be added to traditional revenue management systems to provide the functionalities described in a hybrid version of RM. A new forecaster relies on a data base filled with typical arrival patterns.

A person skilled in the art will understand that some or all of the functional entities as well as the processes themselves may be embodied in software, or one or more software-enabled modules and/or devices or in any combination thereof.

In one exemplary implementation, the subject matter described herein can be implemented using a non-transitory computer readable medium having stored thereon a computer program comprising instructions for carrying out any of the methods described herein. Exemplary computer readable media suitable for implementing the subject matter described herein include disk memory devices, chip memory devices, programmable logic devices, and application specific integrated circuits. In addition, a computer readable medium that implements the subject matter described herein may be located on a single device or a computing platform or may be distributed across plural devices or computing platforms.

This invention has been described with reference to the travel environment. However, it will be appreciated that the invention may apply to other environments, for example other revenue management systems and the like.

It will be appreciated that this invention may be varied in many different ways and still remain within the intended scope of the invention.

The invention claimed is:

1. A revenue management system for updating and limiting future sales of spaces of a travel-related service in which the spaces are capable of being classified in a plurality of classes each having a different pricing, the revenue management system comprising:
a database comprising historical sales of the spaces;
a computing device configured to query the database, the computing device further configured to execute instructions embodied in:
a first forecast module configured to provide a first demand distribution that represents the probability of demand for each scenario of a remaining capacity of the spaces based upon the historical sales of the spaces;
a first optimization module configured to calculate a first plurality of inventory controls for the spaces based upon the first demand distribution and that optimizes revenue;
a second forecast module configured to provide a second demand distribution that represents the probability of demand for each scenario of a remaining capacity of the spaces that is different from the first demand distribution;
a second optimization module configured to calculate a second plurality of inventory controls for the spaces based upon the second demand distribution and that optimizes revenue;
a confidence module configured to measure a confidence level in the first demand distribution and to determine whether the confidence level in the first demand distribution is below a predetermined value; and
a switch module configured to automatically select between the second forecast module and the second optimization module and the first forecast module and the first optimization module,
wherein the switch module is further configured to select the second forecast module and the second optimization module if the confidence level in the first demand distribution is below the predetermined value, to select the second forecast module and the second optimization module in the absence of historical sales, and to select the second forecast module and the second optimization module until a booking period ends if the system switches to the second forecast module and the second optimization module for a second time during the booking period.

2. The revenue management system of claim 1, wherein the second plurality of inventory controls for the spaces calculated by the optimization module ensures a maximum level of revenue in the maximum number of cases.

3. The revenue management system of claim 1, wherein the second demand distribution is a uniform distribution between a maximum demand value and a minimum demand value.

4. The revenue management system of claim 3, wherein the maximum and minimum demand values are defined by a specified percentage around a mean of the first demand distribution.

5. The reservation management system of claim 1 wherein the first inventory controls comprise a first bid-price curve, and the second inventory controls comprise a second bid-price curve that differs from the first bid-price curve.

6. The revenue management system of claim 5, wherein the second optimization module is further configured to calculate the bid-price for a space for each scenario of a remaining capacity of spaces by calculating a revenue for a space for a first scenario of remaining capacity and comparing the calculated revenue of the space for the first scenario of remaining capacity with a calculated revenue for a space for a second scenario of remaining capacity, wherein the second scenario of remaining capacity has one more unit of capacity than the first scenario of remaining capacity.

7. The reservation management system of claim 1 wherein the future sales of spaces are in a first market, and the second demand distribution for the spaces is based upon the arrival patterns from a second market different from the first market.

8. A method of updating and limiting future sales of spaces of a travel-related service in which the spaces are capable of being classified in a plurality of classes each having a different pricing, the method comprising:
calculating with a computing device a first plurality of inventory controls for the spaces based upon a first demand distribution that represents the probability of demand for each scenario of a remaining capacity of the spaces and that optimizes revenue, wherein the first demand distribution is based on historical sales of the spaces;
measuring a confidence level in the first demand distribution;
determining if the confidence level in the first demand distribution is below a predetermined value;
if the confidence level in the first demand distribution is below the predetermined value, automatically selecting a second forecast module configured to be executed by the computing platform to provide a second demand distribution that represents the probability of demand for each scenario of a remaining capacity of the spaces that is different from the first demand distribution;
determining whether historical sales are present or absent;
in the absence of historical sales, selecting the second forecast module and the second optimization module;
during each booking period, monitoring for a switch in the system to the second forecast module and second optimization module for a second time;
in response to the system switching to the second forecast module and second optimization module for the second time during the booking period, selecting the second forecast module and the second optimization module until the end of the booking period; and
calculating with the computing device a second plurality of inventory controls for the spaces based upon the second demand distribution and that optimizes revenue.

9. The revenue management system of claim 8 wherein the second demand distribution is a uniform distribution between a maximum demand value and a minimum demand value.

10. The method of claim 8 wherein the first inventory controls comprise a first bid-price curve, and the second inventory controls comprise a second bid-price curve that differs from the first bid-price curve.

11. The method of claim 8 wherein the future sales of spaces are in a first market, and the second demand distribution for the spaces is based upon the arrival patterns from a second market different from the first market.

12. A computer program product comprising:
a non-transitory computer readable medium; and
a computer program stored on the non-transitory computer readable medium, the computer program comprising instructions for carrying out a method of updating and limiting future sales of spaces of a travel-related service in which the spaces are capable of being classified in a plurality of classes each having a different pricing, the instructions comprising:
calculating a first plurality of inventory controls for the spaces based upon a first demand distribution that represents the probability of demand for each scenario of a remaining capacity of the spaces and that optimizes revenue, wherein the first demand distribution is based on historical sales of the spaces;
measuring a confidence level in the first demand distribution;
determining if the confidence level in the first demand distribution is below a predetermined value;
if the confidence level in the first demand distribution is below the predetermined value, automatically selecting a second forecast module configured to be executed by the computing platform to provide a second demand distribution that represents the probability of demand for each scenario of a remaining capacity of the spaces that is different from the first demand distribution;
determining whether historical sales are present or absent;
in the absence of historical sales, selecting the second forecast module and the second optimization module;
during each booking period, monitoring for a switch in the system to the second forecast module and second optimization module for a second time;
in response to the system switching to the second forecast module and second optimization module for the second time during the booking period, selecting the second forecast module and the second optimization module until the end of the booking period; and
calculating with the computing device a second plurality of inventory controls for the spaces based upon the second demand distribution and that optimizes revenue.

13. The revenue management system of claim 12 wherein the second demand distribution is a uniform distribution between a maximum demand value and a minimum demand value.

14. The computer program product of claim 12 wherein the first inventory controls comprise a first bid-price curve, and the second inventory controls comprise a second bid-price curve that differs from the first bid-price curve.

15. The computer program product of claim 12 wherein the future sales of spaces are in a first market, and the second demand distribution for the spaces is based upon the arrival patterns from a second market different from the first market.

* * * * *